Jan. 9, 1923.

R. F. FRANCE.
HOSE REEL.
FILED FEB. 14, 1921.

Inventor:
Roy F. France

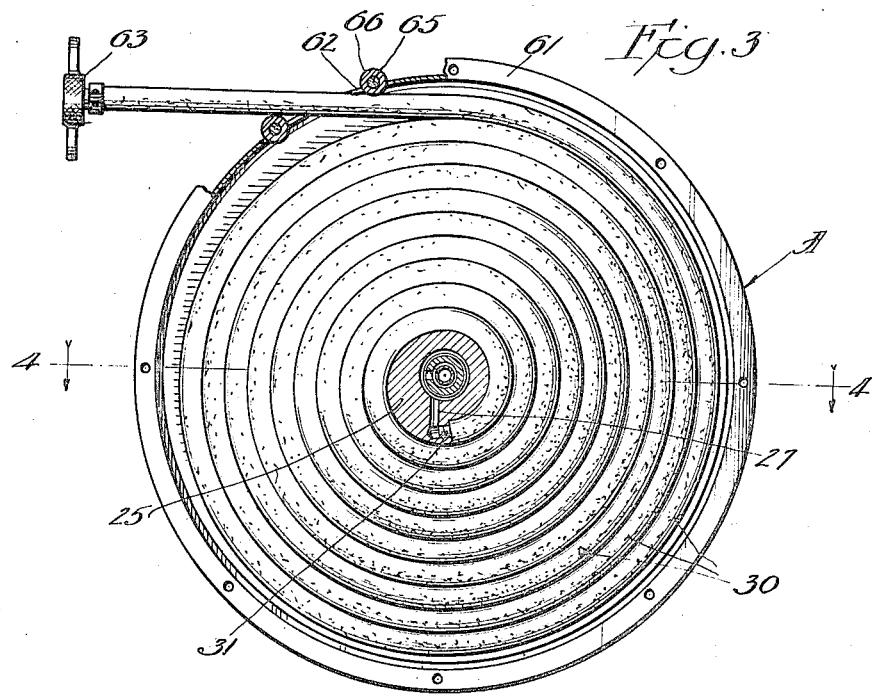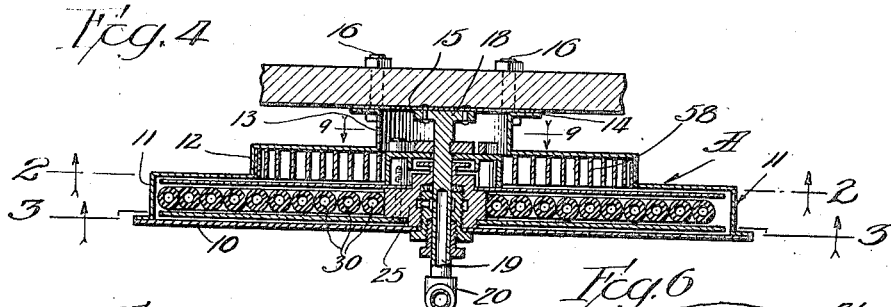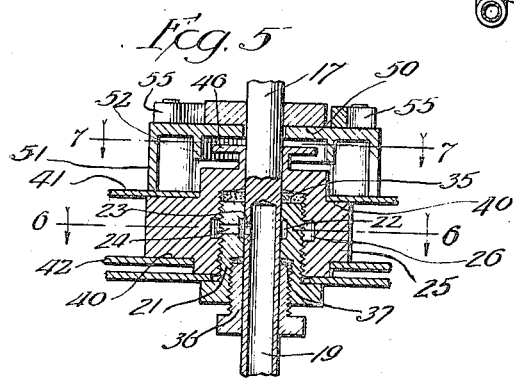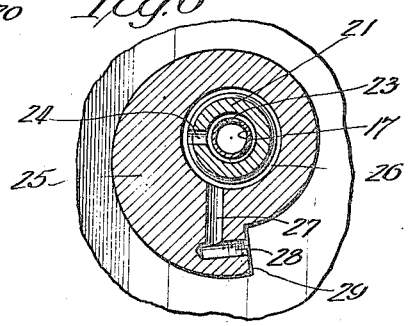

Patented Jan. 9, 1923.

1,441,572

UNITED STATES PATENT OFFICE.

ROY F. FRANCE, OF CHICAGO, ILLINOIS.

HOSE REEL.

Application filed February 14, 1921. Serial No. 444,853.

*To all whom it may concern:*

Be it known that I, ROY F. FRANCE, a citizen of the United States, residing at Chicago, in the county of Cook and State of Illinois, have invented certain new and useful Improvements in Hose Reels, of which the following is a specification.

This invention relates to a hose reel particularly adapted for attachment to an automobile for establishing a connection between a motor driven air pump and any of the tires that may require inflation.

An exemplification of this invention in a preferred form is shown in the accompanying drawings wherein—

Fig. 3 is a similar view taken on line 3—3 of Fig. 4;

Fig. 4 is a longitudinal section taken on line 4—4 of Fig. 3;

Fig. 5 is an enlarged detail in longitudinal section of certain parts located centrally of the reel;

Fig. 6 is a transverse section taken on line 6—6 of Fig. 5;

Figure 1:
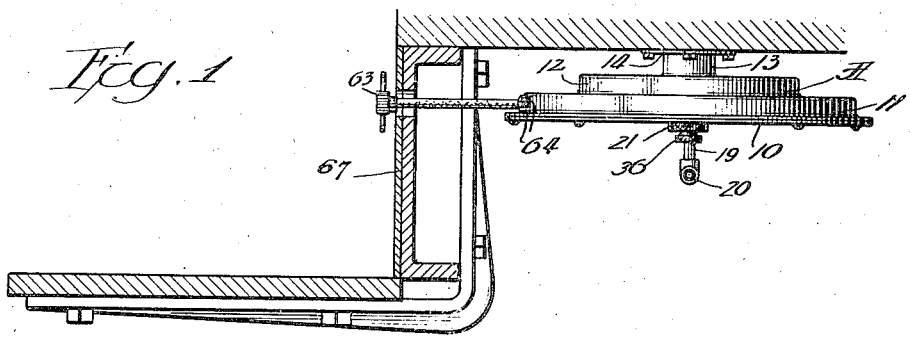
Figure 1 is a side elevation of the casing in which the reel is housed, the device being mounted upon the under side of an automobile, the running board and adjacent parts thereof being illustrated in section.
Figure 2:
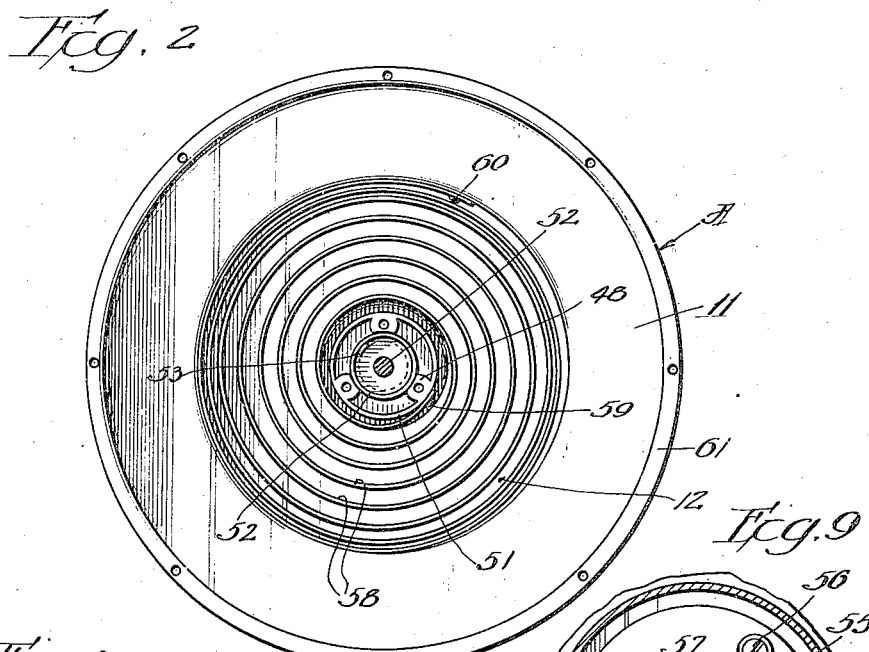
Fig. 2 is a transverse section taken on line 2—2 of Fig. 4.
Figure 7:
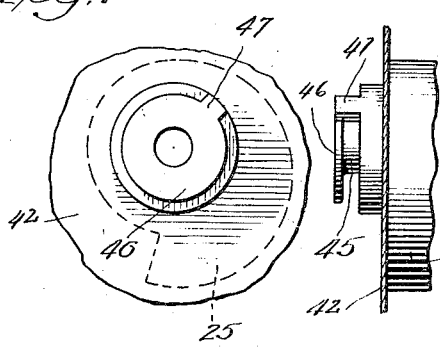
Fig. 7 is a fragmentary section taken on line 7—7 of Fig. 5.
Figure 8:
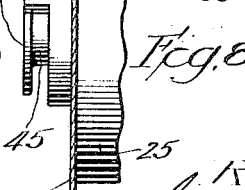
Fig. 8 is a side elevation of the parts shown in Fig. 7.
Figure 9:
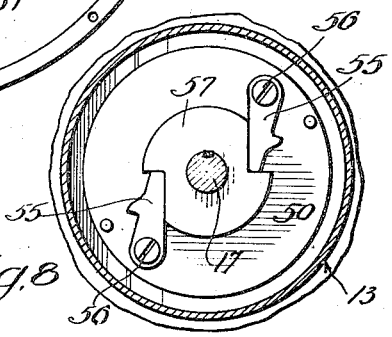
Fig. 9 is an enlarged detail in section of certain parts taken on line 9—9 of Fig. 4.

The parts which are combined in the structure of my invention are preferably enclosed within a housing which is adapted to be fixedly attached to an automobile, preferably in some out of the way place such as beneath the body floor. Accordingly the housing provided for the accommodation of such a device may take the form that is shown in Fig. 1, wherein is shown a generally cylindrical body A to which is removably secured an end plate 10; the walls of the body may be reduced to provide three sections 11, 12, and 13, each, in the order named, being of smaller diameter, and the latter being provided with a flange 14 over which is secured an end plate 15, bolts or screws 16 passing through the flange and plate 15 to fasten the structure to a convenient part of the automobile. A housing constructed in the general manner just described possesses certain advantages for the purposes of my invention, but obviously may be otherwise formed, if desired.

Referring more particualrly to Fig. 4, I have provided axially of the housing a stem 17 which may have at one end a head 18 secured to the end plate 15, this stem being extended longitudinally of the housing so as to project through its other end plate 10. Extending within the stem for a desired portion of its length is a passage 19 that continues to its projecting end on which may be received a fitting 20. A pipe line (not shown) running from a source of air supply may be connected conveniently to this fitting so as to deliver a desired pressure of air to the passage 19.

Surrounding the stem is a bushing 21 in which is an annular channel 22 that communicates with a port 23 leading to the passage within the stem, the bushing being further provided with a port 24 extending transversely through its body from the recess 22. By means such as this communication is established between the interior of the stem and a point exteriorly of the bushing. As appears clearly in Figs. 5 and 6, this bushing is exteriorly threaded adapting it to be fittted within a hub 25 which is provided internally with an annular recess 26 with which the port 24 communicates. A passage 27 leading from the recess 26 communicates with an internally threaded passage 28 which opens out upon a shoulder 29. A flexible tubing 30 adapted to be coiled within the casing is equipped at one end with a threaded nipple 31 so as to connect with the port 28. By a construction such as has been described the air delivered into the stem 17 is educted through the flexible tubing, regardless of the rotary position of the hub and bushing with relation to the stem.

Means are preferably provided to prevent leakage of air, and with this end in view a packing 35 may be arranged adjacent the end of the bushing 21. As will be noted in Fig. 5, I have provided a second bushing 36 which is adapted to screw partly within the bushing 21 and a second packing 37 may be arranged adjacent the end of the second bushing, as shown, thereby preventing escape of air down around the stem 17. It is to be remembered that the stem 17 remains stationary at all times, but the other parts in surrounding relation thereto may be rotated therearound whenever the tubing 30 is unreeled for the purpose of delivering air to a desired point.

Referring again to Fig. 5, it will be noted that the hub is formed with oppositely disposed shoulders 40 upon which are secured circular plates 41 and 42 in spaced relation, these plates lying within the plane of section 11 of the casing. These two plates, together with the hub to which they are attached, constitute a reel adapted to receive the flexible tubing 30 which may wind thereupon, as shown clearly in Fig. 3. One end of the hub extends lengthwise of the stem 17 into the plane of section 12 of the housing and is provided therein with a neck 45 on which is carried a head 46 in the form of a plate. Extending from the hub to the head is a lug 47 that lies to the outside of the periphery of the head. The portion of the hub which lies within the plane of the section 12 is also disposed within a member in the form of a cup having a flat base 50 and an outer cylindrical wall 51, as well as an inner cylindrical wall 52 spaced therefrom and projecting for a less distance from the base of the cup. Within the space defined by the inner cylindrical wall 52 is a lug or projection 53 that lies in the circular path of movement of the lug 47 when the parts are assembled in the manner shown in Figs. 4 and 5. Upon the reverse side of the cup base 50 is a pair of dogs 55 pivoted as at 56, and actuated either by springs (not shown) or by gravity, according to the position in which the device is used, to engage with a notched disk 57 which is keyed or otherwise made fast to the stem 17. Arranged within the annular space between the cup walls 51 and the casing walls 12 is a coiled spring 58, its opposite ends being secured to these walls, respectively, as at 59 and 60.

Referring to Fig. 3 wherein is broken away a short section of a flange 61 which is outwardly extended from the wall 11 to lie against the end plate 10, it will be noted that the wall 11 is provided with an opening 62 through which the flexible tubing may pass to the outside of the structure. At its outer end is any suitable fitting 63 for the purpose of making a convenient connection with the valve of a tire that is to be inflated. By preference, the walls 11 of the structure adjacent the opening 62 are formed with ears 64 (see Fig. 1) through which is extended a pin 65 providing a mounting for a roller 66, the purpose being to afford an anti-frictional surface with which the tubing may contact as it is moved into and out of the casing. According to the structure which has been described, the spring 58 is adapted to remain under tension so as to normally rotate the reel to wind up the tubing thereon. The stem 17 remains stationary during all movements of the reel, but as the latter is revolved, it communicates motion to the lug 47 which engages with the projection 53 so as to wind up the spring as the hose is pulled out. The dogs 55 engage with the notched plate 57 in a well known manner so as to check rewinding of the reel except when the same is permitted entire freedom of operation with sufficient speed to prevent operation of the dogs.

It is to be noted that the device of this invention presents a very simple and compact structure which may be conveniently located in any out of the way place. A permanent pipe connection may be maintained between the power operated pump and the stem 17 so that whenever the tire is to be inflated it is merely necessary that the flexible tubing be pulled out and connected with the proper air valve. Upon actuating the clutch which sets in operation the pump, air will at once be delivered to the tire where the hose is connected. The advantage of this arrangement is, of course, that the hose is kept always ready for use in a place that is instantly available. As suggested in Fig. 1, the hose end may be arranged exteriorly of an apron 67 which is adjacent the running board, the fitting 63 being such as to prevent the hose from being withdrawn to the inner side thereof. The assembly of the parts which constitute this invention is also advantageous in that by removing the end plate 10 the hose reel may be freely withdrawn from the structure without involving any disarrangement of the remaining parts. Such a procedure might be very desirable in case of repairs to or replacement of the flexible tubing.

I claim:

1. In a device of the kind described, a casing, a hollow stem arranged therewithin, a connection between the stem and a source of air supply, a reel mounted to revolve about the stem, a flexible tubing wound upon the reel and having one end connected therewith, there being passages extending between the connected end of the tubing and the interior of the stem whereby air may freely pass from the one to the other, a spring within the casing coiled around the reel axis and arranged adjacent the reel with one of its ends secured thereto, and a connection between the reel and spring permitting the reel to be withdrawn from the casing without affecting the spring, substantially as described.

2. In a device of the kind described, a casing formed to present two sections, a reel rotatably mounted in one section and shaped to close off the other section, a coiled spring arranged within the latter section having one end attached to the casing, a member in the latter section mounted to rotate about the same axis as the reel and connected with the opposite end of the spring, a detachable connection between said member and the reel, means for permitting the reel to be withdrawn from the casing and to be disassociated from the member without affecting the spring, and a flexible tubing adapted to be wound upon the reel having connection therewith, there being means for continuing said connection through to a source of air supply, substantially as described.

3. In a device of the kind described, the combination of a casing within which is a hollow axial stem, a reel and a member separate therefrom each mounted to rotate upon the stem, means serving to detachably connect the reel with the member when these two parts are in juxtaposition, a flexible tubing connected at one end with the reel and adapted to be wound thereupon, there being passages extending from the connected tubing end to the interior of the stem, a constant connection between the stem and a source of air supply, and a spring connected with the casing and with the member and coiled around the latter in adjacent relation to the reel, the spring being adapted to rotate the reel to wind the tubing thereupon, substantially as described.

ROY F. FRANCE.

Witness:
EPHRAIM BANNING.